United States Patent
Boyd (10) Patent No.: US 9,904,636 B2
(45) Date of Patent: Feb. 27, 2018

(54) MODULAR ULTRA-WIDE INTERNAL BUS MAINFRAME PROCESSING UNITS

(71) Applicant: John Boyd, Portland, OR (US)

(72) Inventor: John Boyd, Portland, OR (US)

( * ) Notice: Subject to any disclaimer, the term of this patent is extended or adjusted under 35 U.S.C. 154(b) by 176 days.

(21) Appl. No.: 14/920,133

(22) Filed: Oct. 22, 2015

(65) Prior Publication Data

US 2017/0116140 A1    Apr. 27, 2017

(51) Int. Cl.
*G06F 13/16* (2006.01)
*G06F 13/40* (2006.01)

(52) U.S. Cl.
CPC ...... *G06F 13/1684* (2013.01); *G06F 13/1673* (2013.01); *G06F 13/1678* (2013.01); *G06F 13/4004* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 5,113,500 A | 5/1992 | Talbott et al. | |
| 6,021,453 A | 2/2000 | Klingman | |
| 7,571,414 B2 | 8/2009 | Huang et al. | |
| 2009/0024819 A1* | 1/2009 | Fisher | G06F 12/0897 711/170 |
| 2009/0144486 A1 | 6/2009 | Tat-Hin | |
| 2010/0017873 A1* | 1/2010 | Sievert | G06F 9/54 726/17 |
| 2010/0111088 A1* | 5/2010 | Olofsson | G06F 15/17381 370/392 |
| 2012/0036337 A1* | 2/2012 | Grossi | G06F 9/4881 712/208 |

FOREIGN PATENT DOCUMENTS

| | | |
|---|---|---|
| EP | 0440452 | 10/1996 |
| WO | 9900744 | 1/1999 |
| WO | 2013142294 | 9/2013 |

* cited by examiner

*Primary Examiner* — Scott Sun
(74) *Attorney, Agent, or Firm* — Mohr Intellectual Property Law Solutions, PC (57) ABSTRACT

Modular processing units for mainframe construction built around an ultra-wide internal bus, and equipped with memory storage, an arithmetic logic unit and instruction execution unit, and a plurality of input/output ports that are designed to be directly connected with identical neighbor modular processing units, to form a mainframe computing array. In some examples, the processing units include multiple instruction units. In some further examples, the processing units include all necessary components on a single chip, in a single chip carrier package, needing only a properly specified power source.

17 Claims, 6 Drawing Sheets

MODULAR ULTRA-WIDE INTERNAL BUS MAINFRAME PROCESSING UNITS

BACKGROUND

The present disclosure relates generally to computer architecture. In particular, modular processing units that possess an ultra-wide internal bus which are useful for constructing mainframe systems are described.

Modern mainframe systems are often built in a modular fashion, employing a large number of identical computing nodes interconnected in an array or grid configuration. These computing nodes are sometimes built around commodity processors, such as those offered by Intel or Advanced Micro Devices. These processors may be based on the iAPX architecture that is widely deployed in laptops, PCs, and file servers throughout the business world. Consequently, the configuration of each such node is constrained to the selected processor and supporting chipset.

Known systems and means for constructing mainframe systems based on commodity processor nodes are not entirely satisfactory for the range of applications in which they are employed. For example, nodes that employ existing commodity processors are constrained by well-known architecture limitations, including node system bus design that requires communications to travel through the central processor. In addition, such conventional nodes are often limited in overall bandwidth due to a system bus that is commonly at most 64 bits wide. Furthermore, as the node system bus is commonly a single width throughout the computing node, close timing of all system components becomes a critical factor in overall performance as devices that are slower to read or write data to the system bus typically determine the speed at which the overall node runs.

A further disadvantage of the current practice of using commodity processor nodes for mainframe construction is the additional hardware required in each node to support the processor. Most commodity processors require separate memory banks and bridge chipsets that handle system I/O. These physically separate components require circuit boards for interconnection, which in turn increases costs and energy requirements for each node, in addition to adding to system complexity and failure points.

Thus, there exists a need for a system architecture that improves upon and advance the design of known mainframe system architecture approaches. Examples of new and useful mainframe architectures relevant to the needs existing in the field are discussed below.

Disclosure addressing one or more of the identified existing needs is provided in the detailed description below. Examples of references relevant to modular ultra-wide internal bus processing units include U.S. Patent References: U.S. Pat. Nos. 5,113,500, 6,021,453, and 7,571,414; U.S. Patent Application Publications: 20090144486 and 20100111088; European Patent Specification EP0440452B1; and WIPO PCT Application. Publications: WO 1999/00744 and WO 2013/142294. The complete disclosures of the above patents and patent applications are herein incorporated by reference for all purposes.

SUMMARY

The present disclosure is directed to a modular processing unit for mainframe construction that is equipped with an ultra-wide bus. The modular processing units are built around the ultra-wide internal bus, and are equipped with memory storage, an arithmetic logic unit and instruction execution unit, and a plurality of input/output ports that are designed to be directly connected with identical neighbor modular processing units, to form a computing array that is the basis of a modern mainframe system. The nodular processing units take advantage of a system-on-a-chip architecture to reduce or eliminate the need for the supporting electronic components required in most conventional mainframe processing node implementations. In some examples, the processing units include multiple instruction units. In some further examples, the processing units include all necessary components on a single chip, in a single chip carrier package, needing only a properly specified power source.

DETAILED DESCRIPTION

The disclosed modular mainframe processing units will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various modular mainframe processing units are provided. Related features in the examples may be identical, similar, or dissimilar in different examples. For the sake of brevity, related features will not be redundantly explained in each example. Instead, the use of related feature names cue the reader that the feature with a related feature name may be similar to the related feature in an example explained previously. Features specific to a given example will be described in that particular example. The reader should understand that a given feature need not be the same or similar to the specific portrayal of a relate feature in any given figure or example.

With reference to FIGS. 1-6, an example of a modular ultra-wide internal bus mainframe processing unit, processing unit 100, will now be described. Processing unit 100 functions to provide a simplified unit for constructing large computing arrays that form the basis for a modern mainframe system. The reader appreciate from the figures and description below that processing unit 100 addresses shortcomings of conventional computing nodes currently used to construct mainframe computing arrays.

For example, processing unit 100 is based around a comparatively very wide bit-width internal bus, which serves to both move large amounts of data with each system cycle, and in conjunction with the other processing unit 100 components acts as a form of data cache. Further, by utilizing an internal bus, processing unit 100 can be implemented on a single chip, which in turn can be mounted in a single chip carrier package. A single chip implementation reduces cost and complexity, and increases system reliability and responsiveness as compared to multiple chip implementations that require the use of a circuit board. A further benefit is a reduction in power consumption, as a node using a single chip can be engineered to draw significantly less power than traditional multiple chip configurations. Single chip implementations are commonly known in the art as systems-on-a-chip (SoC).

Figure 1:
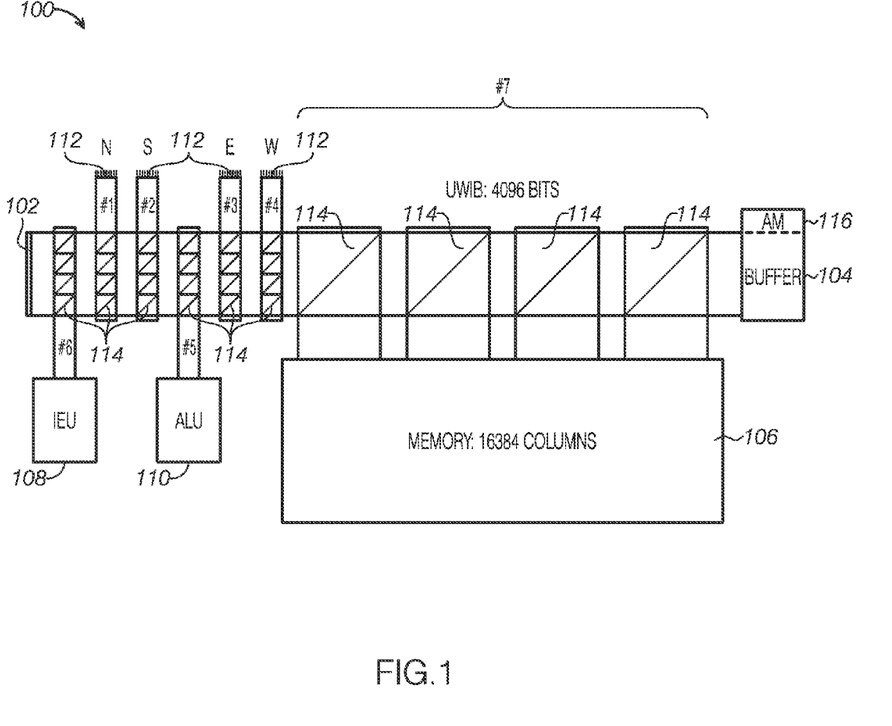
FIG. 1 is a block diagram of an example of a modular ultra-wide internal bus mainframe processing unit.

Processing unit 100 includes data bus 102 that is internal to processing unit 100, a buffer 104 that is equal in bit-width to data bus 102, a memory array 106, an instruction execution unit (IEU) 108, arithmetic logic unit (ALU) 110, and input/output ports 112. Each of these components interfaces with data bus 102 by way of one or more multiplexors 114. The architecture of processing unit 100 is preferably engineered to be fabricated on a single chip, effectively creating a system or node on a single chip architecture that can be installed in a single physical package. In other examples, processing unit 100 includes additional or alternative features such as multiple IEUs 108 and ALUs 110, to create a multiple-core design.

As can be seen in FIG. 1 and will become plain with the description of related components herein, internal data bus 102, denoted as the ultra wide internal bus ("UWIB") has a substantially higher bit width than implementations known in the current art. While typical current art implementations are 32 to potentially 128 bits (or possibly 256 bits; data bus 102 is preferably at least 4096 bits in width. Data bus 102 forms the backplane of processing unit 100, and ties all components together. This ultra-wide construction allows data bus 102, in conjunction with the other components of processing unit 100, to effectively act as a cache or limited term buffer memory. Each of the constituent components, except for buffer 104, interfaces with data bus 102 by way of one or more multiplexors 114.

To ensure data integrity, error checking features may be implemented in conjunction with data bus 102. One possible scheme involves including parity bits and information flags, and blocking data transmissions with a CRC (cyclic redundancy check) block. By way of example, with eight bits of parity and an eight bit flag for every 64 bits, a data bus 102 that is 4096 bits wide would have an actual width of 5120 bits (4096 bits data+512 bits parity+512 bits flag).

Attached to internal data bus 102 is buffer 104, which is matched in bit width to data bus 102. Buffer 104 preferably has 64 storage locations, and is designed to work in conjunction with data bus 102 as a short term cache, allowing the storage of up to 64 4 kb long data entries placed on data bus 102. Buffer 104 is preferably implemented as high-speed static RAM, and is preferably configured with pre-designated functions for each of the 64 storage locations. For example, groups of locations may be pre-allocated to input/output ports 112, ALU 110, IEU 108, and memory array 106. Alternatively, buffer 104 could dynamically allocate locations based on factors such as historical usage or program demands. Also in conjunction with buffer 104 is address manager 116.

Figure 2:
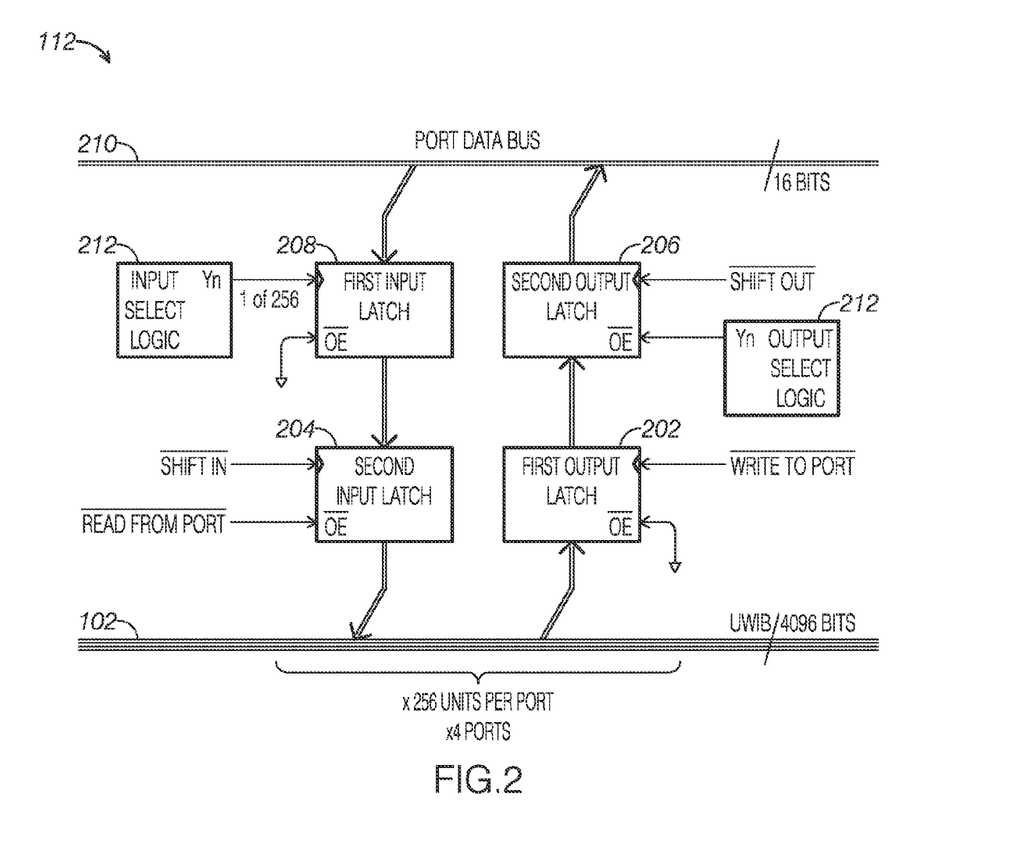
FIG. 2 is a block diagram of the processing unit shown in FIG. 1 depicting the components of one of the input/output ports as it interfaces with the internal bus.

Turning to FIG. 2, the multiplexor 114 interface between internal data bus 102 and input/output port 112 is diagramed. Data bus 102 is in electrical data communication with data bus 102—side facing output latch 202 and input latch 204. As is shown in FIG. 2, input and output are preferably each handled via dedicated channels. Output latch 202, which accepts data on data bus 102 for output through input/output port 112, and input latch 204, which accepts data coming in through input/output port 112 for placement on data bus 102, are each the same width as data bus 102. Upon strobing of the appropriate signal line, either read the current data on data bus 102 in the case of output latch 202 and store it until a subsequent strobing of the signal line, or assert the latch contents on data bus in the case of input latch 204 upon strobing of its associated signal line. As will be appreciated by a person skilled in the relevant art, a latch is a metastable device that temporarily remembers a logic state asserted upon the latch's input upon strobing of a signal line until the signal line is again strobed, whereupon the latch memorizes the new current state asserted upon its input. The use of latches allows input/output port 112—and indeed all the various devices attached to data bus 102—to operate upon data without the need for its continual assertion upon data bus 102.

Continuing with FIG. 2, output latch 202 and input latch 204 are in turn attached to second output latch 206 and first input latch 208, respectively. In the preferred embodiment, output latch 206 and input latch 208 are each segmented into 256 16-bit segments, to match the 4096 bit width of data bus 102 and attached output latch 202 and input latch 204. The 16-bit segmentation matches the preferred embodiment's implementation of the 16-bit wide port data bus 210 of input/output port 112. Select logic 212 is used to determine which of the 236 16-bit segments of output latch 206 and input latch 208 are either asserted on or read from port data bus 210, respectively. The double latch configuration of the input and output channels effectively interfaces and translates between the comparatively narrow port data bus 210 and ultra-wide internal data bus 102. It will be appreciated by a person skilled in the relevant art that port data bus 210 need not be limited to a 16-bit implementation; other variants such as 8-bit, 32-bit, 64-bit, 128-bit, or even up to a bit-width equal to internal data bus 102 may be implemented without deviating from the disclosed invention. In such variants, the segmentation of output latch 206 and input latch 208 will be varied to appropriately divide the bit width of data bus 102. It will also be appreciate that, where port data bus 210 is equal in bit width to data bus 102 the port data bus 210—facing latches can optionally be omitted, with output latch 202 and input latch 204 directly interfacing between data bus 102 and port data bus 210.

Each processing unit 100 preferably possesses four input/output ports 112, each of which in turn can be directly connected to the input/output port of a neighboring processing unit 100. By so interconnecting processing units 100, a grid arrangement of processing units 100 is obtained. Strobing of appropriate input/output port 112 pins can control operation of input/output port 112, resulting in sequential transmission of data stored in associated latches, and facilitate communication between connected ports.

Figure 3:
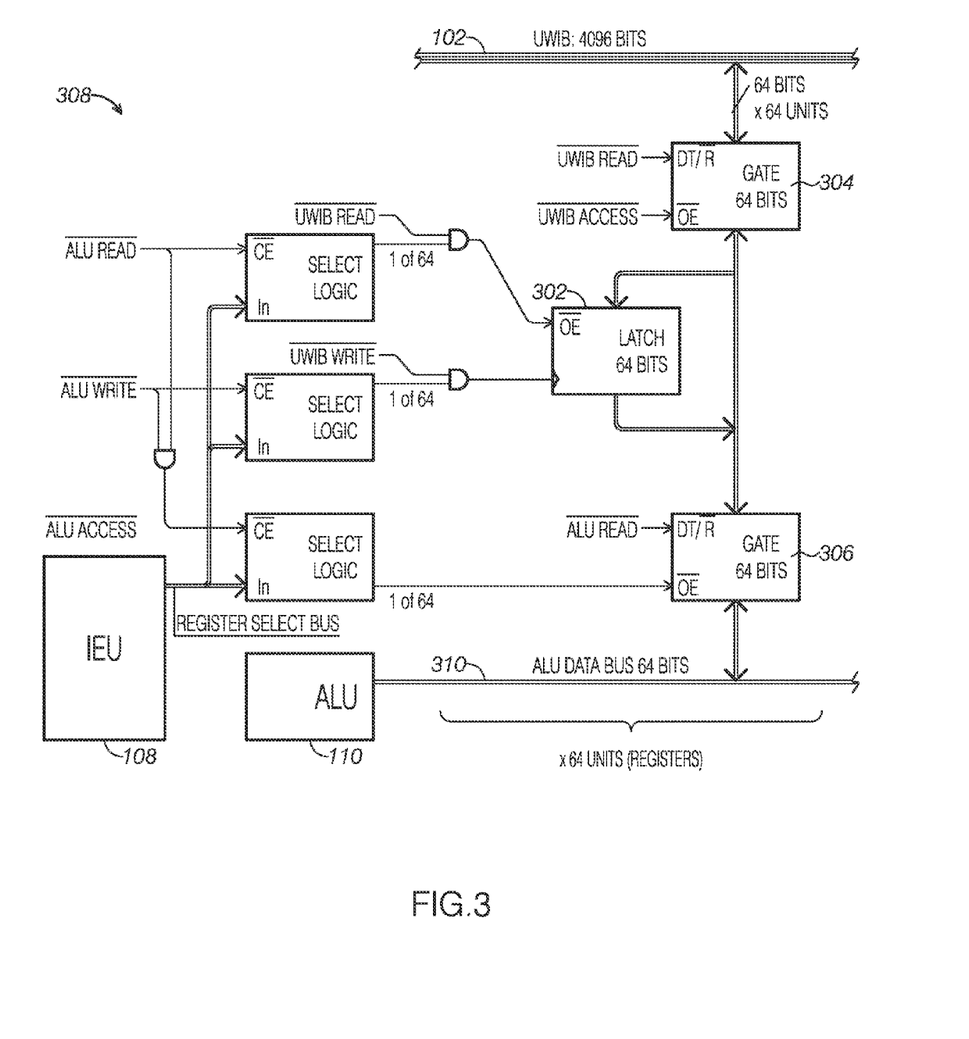
FIG. 3 is a block diagram of the processing unit shown in FIG. 1 depicting the components of the arithmetic logic unit as it interfaces with the internal bus.

FIG. 3 illustrates the multiplexor 114 interface for ALU 110. ALU 110, in conjunction with IEU 108, forms the processing functionality for processing unit 100. Conceptually, ALU 110 sees each 4096 bit data chunk placed on internal data bus 102 as a set of 64 registers, each 64 bits long. A latch 302, which is the same bit width as data bus 102, stores each set of registers that ALU 110 will work upon, and moves data between internal data bus 102 and ALU data bus 310. Latch 302 is protected from each data bus by logic gates 304 and 306, which prevent simultaneous access to latch 302 by both internal data bus 102 and ALU data bus 310. Logic gate 304, which faces data bus 102, is of equal bit width to data bus 102. Logic gate 306 is divided into 64 sections (corresponding to the conceptual 64 registers) that are each 64 bits long. Control logic 308 controls gate 306 and latch 302, to determine which of the 64 sections is placed upon ALU data bus 310 for use by ALU 110. Likewise, control logic 308 strobes latch 302 when ALU 110 places results upon ALU data bus 310, for eventual placement upon internal data bus 102. Similar to input/output ports 112, control logic 308 includes logic for selecting one of the 64 sections for placement upon data bus 102, with sequential selection being utilized to place all 64 sections upon data bus 102 where the full 4096-bit width is desired.

A person skilled in the relevant art will appreciate that implementing ALU 110 to read 64 registers that are each 64 bits long is only one possible configuration. Variations in length and number of registers can be implemented in the alternative without deviating from the disclosed invention. Moreover, here multiple ALUs 110 are implemented, each ALU 110 could alternatively be configured with an array of registers that differs from other ALUs 110, thereby enabling simultaneous operations on registers of varying lengths.

Figure 4:
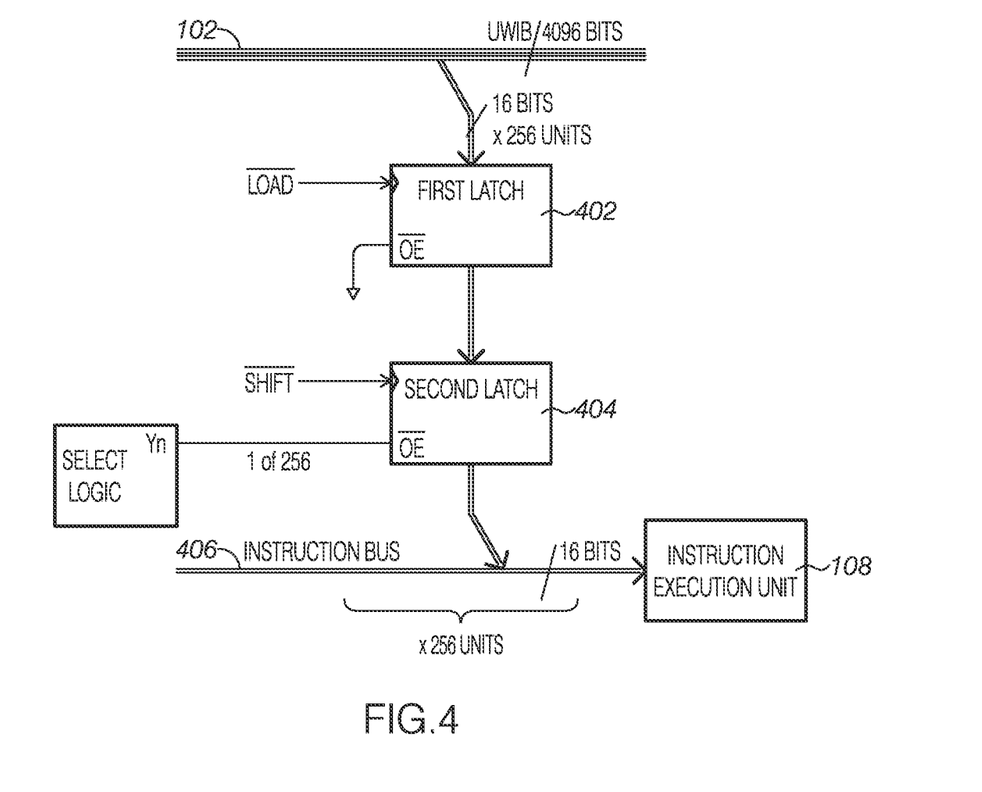
FIG. 4 is a block diagram of the processing unit shown in FIG. 1 depicting the instruction execution unit as it interfaces with the internal bus.

In the example shown in FIG. 4, the multiplexor 114 interface between internal data bus 102 and MU 108 is diagramed. The interface comprises a first latch 402 double-buffered with a second latch 404, which in turn connects to IEU instruction bus 406, which feeds to IEU 108. First latch 402, similar to other latches that are data bus 102—facing, is of equal bit width to data bus 102. Second latch 404 is segmented into 256 sections, each 16 bits long, which are in turn placed upon IEU instruction bus 406, as per selection logic that controls second latch 404. First latch 402 is controlled by direct memory access logic, which interacts with memory array 106 to locate the necessary code block to be executed IEU 108, and place the same on data bus 102 for retrieval.

Direct memory access (DMA) logic interfaces with logic gates associated with each component of processing unit 100, which in turn are used to control read and write operations, and to signal service requests from components. The DMA logic can also include several registers that interact with ALU 110 and IEU 108. ALU 110 includes a stack pointer, and IEU 108 includes instruction, stack, and branch pointers. The DMA logic may further include pointers to current memory locations, as well as read/write selection pointers for each input/out port 112.

As with ALU 110, a person skilled in the relevant art will appreciate that multiple IEUs 108 may be deployed, each with varying configurations of segmentation, and that the disclosed invention is not limited to the 256 segments of 16 bits each.

Figure 5:
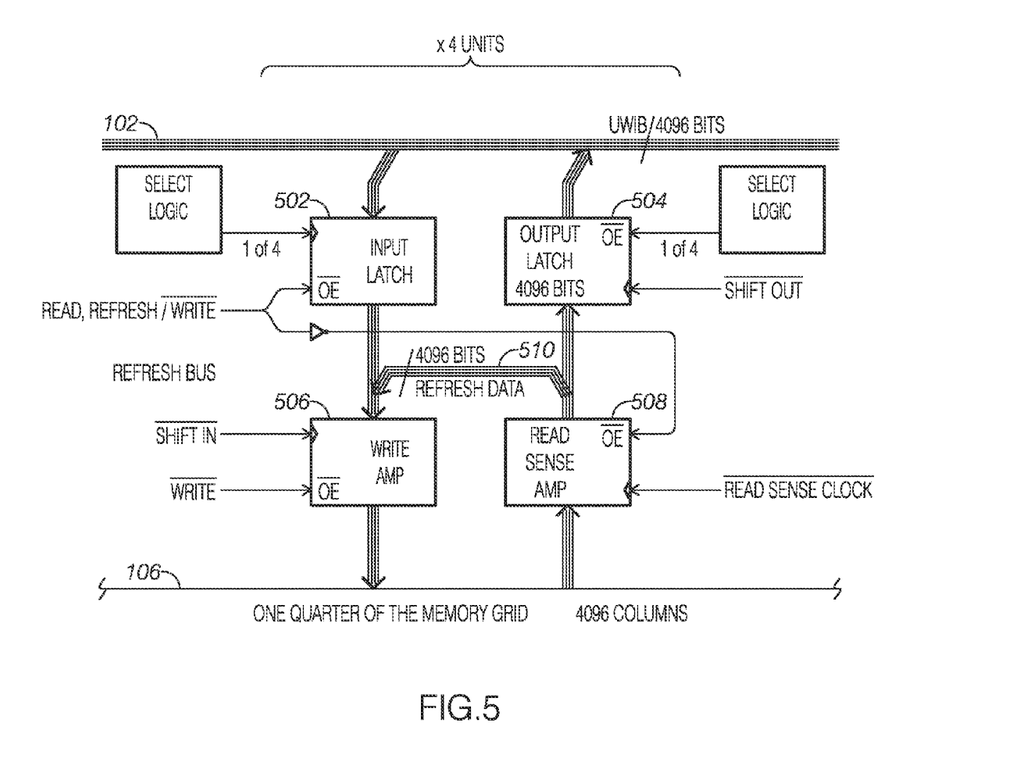
FIG. 5 is a block diagram of the processing unit shown in FIG. 1 depicting the interface between the internal bus and the on-board memory.

Turning attention to FIG. 5, the interface between memory array 106 and internal data bus 102 is shown. Memory array 106, which is dimensioned at four times the bit width of data bus 102, interfaces with data bus 102 via a series of four multiplexors 114. As with the data bus 102—facing latches associated with the other components, input latch 502 and output latch 504 are both the same bit width as data bus 102. However, write atop 506 and read sense atop 508 each operate on the full 16 kbit width of memory array 106. Input latch 502 and output latch 504 are connected to selection logic that reads or asserts, in the case of input latch 502 and output latch 504, respectively, each quarter section of memory array 106, and either writes to write amp 506 or reads from read sense amp 508. Memory array 106 is typically implemented using dynamic RAM technology, which requires refresh cycles. Thus, read sense amp 508 is configured to feed back directly to write atop 506 each section of data read via refresh bus 510. As both read sense atop 508 and input latch 502 feed into write amp 506, logic is supplied to ensure that both read sense amp 308 and input latch 502 are prevented from writing to write amp 506 simultaneously.

It will be appreciated by a person skilled in the relevant art that implementing memory array 106 at four times the size of data bus 102 is only one possible configuration, and memory 106 may be implemented in a variety of configurations without departing from the disclosed invention.

Figure 6:
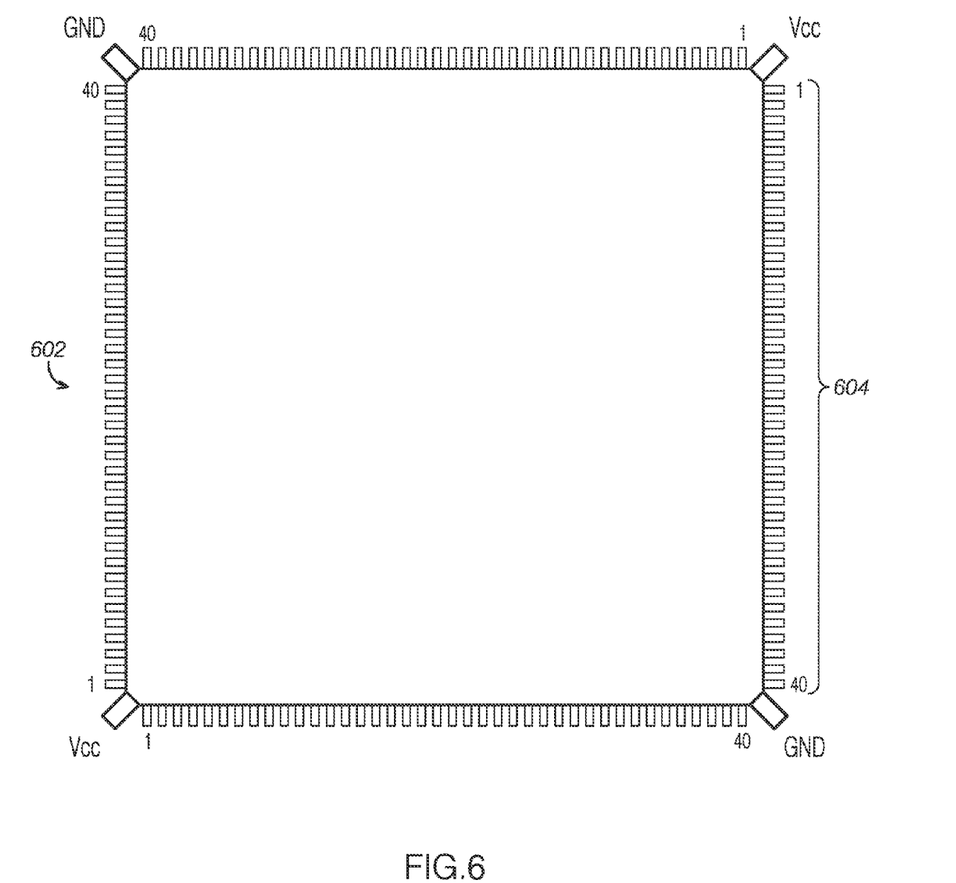
FIG. 6 is a depiction of an example single chip carrier that can be used to house an implementation of a modular ultra wide internal bus mainframe processing unit.

FIG. 6 presents one possible configuration of a physical package suitable for implementing an embodiment of processing unit 100. Single chip carrier 602 is preferably a surface mount technology package. Each side 604 of single chip carrier 602 is equipped with pins that include signaling pins, as well as pins that connect to port data bus 210 of input/output port 112. With processing unit 100 implementing four input/output ports 112, each side 604 provides an external interface to one of the input/output ports 112. The included signaling pins allow each side 604 to connect directly to a corresponding side 604 on an adjacent processing unit 100. It will be understood by a person skilled in the relevant art that the dimensions and pin specifications of single ship carrier 602 may vary depending on the actual implementation of processing unit 100.

Where processing units 100 can be combined to create a mainframe computing array, some supporting chips are typically necessary. Under a preferred implementation, a system of processing units 100 includes a peripheral reset controller chip. The controller chip is responsible for resetting and starting up an array of processing units 100. The controller chip strobes a reset line on an adjacent processing unit 100, which causes it to reset, and then is taken control by the controller chip. The reset processing unit 100 then is instructed to repeat the process to its adjacent neighbors, and so forth, until the entire array is reset. As processing units 100 reset and come online, the controller chip can build a map of available system resources.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A modular mainframe processing unit enclosed within a physical package, comprising:
   an internal data bus internal to the physical package;
   a buffer unit in data communication with the internal data bus;
   a memory unit in data communication with the internal data bus;
   an instruction execution unit in data communication with the internal data bus;
   an arithmetic logic unit in data communication with the internal data bus; and
   a plurality of port data busses in data communication with the internal data bus and enabling data communication external to the physical package, wherein:
      the port data busses, instruction execution unit, arithmetic logic unit and memory unit each connect to the internal data bus by one or more multiplexing units;
      the arithmetic logic unit utilizes its associated one or more multiplexing units as a set of registers;
      each of the plurality of port data busses is capable of data communication with a port data bus on other modular mainframe processing units; and
      the bit width of internal data bus is greater than the bit width of the instruction execution unit, arithmetic logic unit, and plurality of port data busses.

2. The processing unit of claim 1, wherein the one or more multiplexing units each are comprised of one or more latches.

3. The processing unit of claim 1, wherein the instruction execution unit utilizes its associated one or more multiplexing units as a block of executable code.

4. The processing unit of claim 1, wherein bit width of the buffer unit is identical to the bit width of the internal data bus.

5. The processing unit of claim 4, wherein the buffer unit has at least 64 storage locations.

6. The processing unit of claim 1, wherein the physical package further comprises a single chip carrier.

7. The processing unit of claim 1, wherein the internal data bus has a bit width of at least 4096 bits.

8. The processing unit of claim 1, wherein the bit width of the memory unit is at least four times the size of the bit width of the internal data bus.

9. A modular processing unit, comprising:
   a data bus with a buffer;
   a memory unit in data communication with the data bus via at least one multiplexer;
   at least one arithmetic logic unit in data communication with the data bus via at least one multiplexer;
   at least one instruction execution unit in data communication with the data bus via at least one multiplexer; and
   a plurality of data ports each in data communication with the data bus via at least one multiplexer, and each capable of data communication with one of the plurality of data ports located on another modular processing unit.

10. The processing unit of claim 9, wherein:
    the bit width of the data bus is greater than the bit width of the at least one arithmetic logic unit, the at least one instruction execution unit, and the plurality of data ports; and
    each of the at least one multiplexer associated with the at least one arithmetic logic unit, the at least one instruction execution unit, and the plurality of data ports allows selection of a portion of the data bus equal to the bit width of its associated component with which to communicate.

11. The processing unit of claim 10, wherein the bit width of the memory unit is greater than the data bus.

12. The processing unit of claim 9, wherein the at least one arithmetic logic unit is capable of using its at least one multiplexer as a register set.

13. The processing unit of claim 9, wherein the at least one instruction execution unit is capable of using its at least one multiplexer as a block of executable code.

14. The processing unit of claim 9, wherein the modular processing unit is contained on a single chip carrier, with a plurality of external leads that are electrically connected to the plurality of data ports.

15. A modular mainframe processing unit enclosed within a single chip carrier, comprising:
    an internal data bus and associated buffer;
    a plurality of ports, each of identical bit width, further comprising:
       a plurality of pins on the single chip carrier that allow for external connections to each of the plurality of ports; and
       where each of the plurality of ports is connected to the internal data bus by one or more multiplexers;
    one or more arithmetic logic units in data communication with the internal data bus via one or more multiplexers;
    one or more instruction execution units in data communication with the internal data bus via one or more multiplexers; and
    one or more memory units in data communication with the internal data bus via one or more multiplexers,
    wherein each of the one or more multiplexers is further comprised of one or more latches.

16. The processing unit of claim 15, wherein:
    the bit width of each of the one or more memory units is at least four times the bit width of the internal data bus; and
    the bit width of each of the one or more arithmetic logic units, instruction execution units and plurality of ports is less than the bit width of the internal data bus.

17. The processing unit of claim 16, wherein the internal data bus is 4096 bits wide, and the number of the plurality of ports is four.

* * * * *